March 3, 1936. J. S. CAMPBELL 2,032,650
LAWN MOWER
Filed March 1, 1935
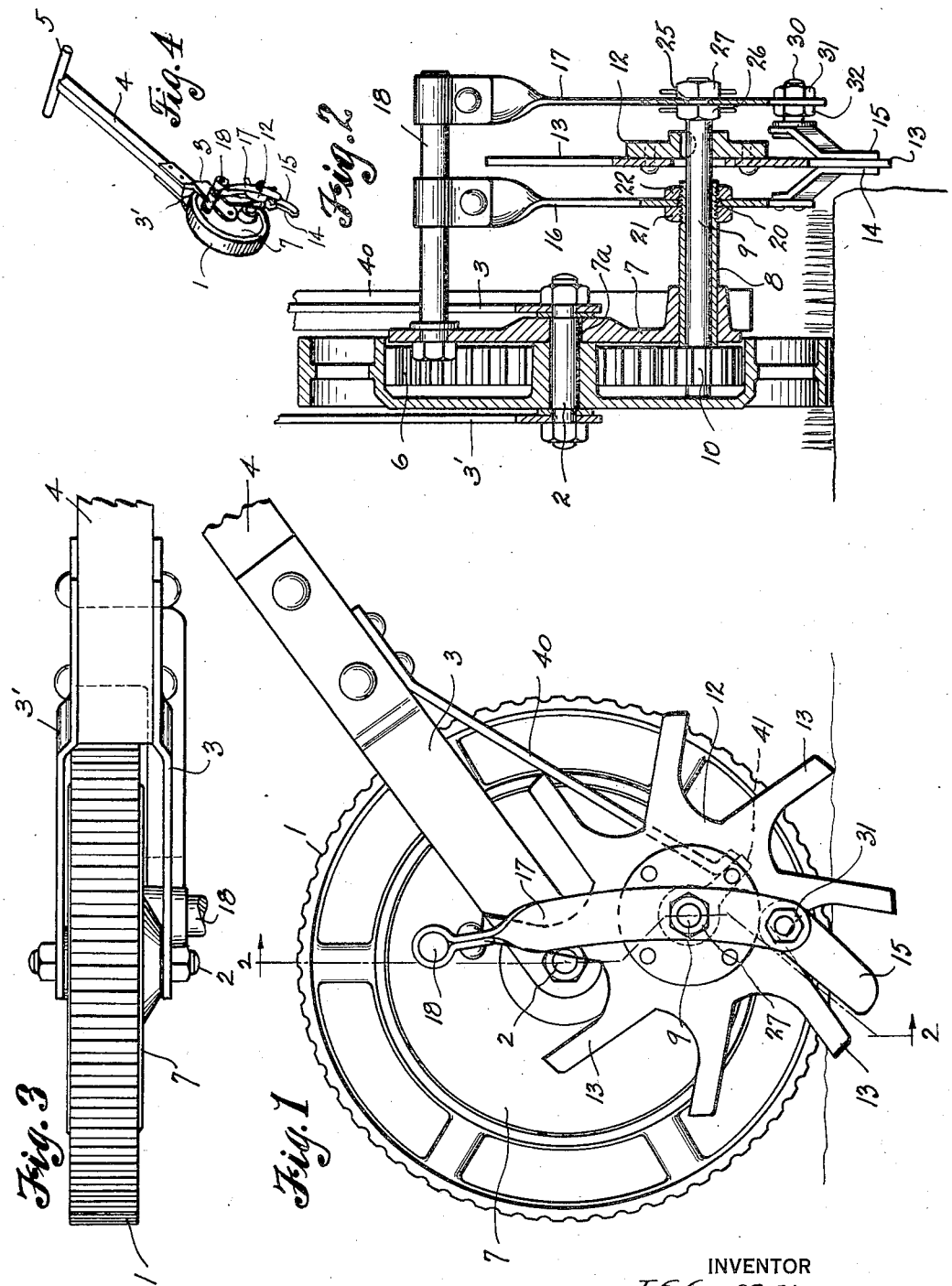
INVENTOR
J. S. CAMPBELL
BY
Cook & Robinson
ATTORNEY Patented Mar. 3, 1936

2,032,650

UNITED STATES PATENT OFFICE 2,032,650

LAWN MOWER

John S. Campbell, Everett, Wash.

Application March 1, 1935, Serial No. 8,893

2 Claims. (Cl. 56—256)

This invention relates to improvements in lawn edgers, and it has reference in particular to a type of construction especially suited to the trimming of grass along the edges of flower beds, sidewalks, and the like, where it is ordinarily required that the grass be trimmed by means of hand shears; it being the principal object of this invention to provide a device of the above character and for the above purposes, having a grass cutting mechanism of novel construction arranged to cut in a vertical plane parallel with and spaced inwardly a slight distance from the plane of a single ground wheel with which the device is equipped.

Another object of the invention is to provide a grass cutting mechanism including a revolubly driven wheel having a plurality of radially extended blades for shearing action between two fixed blades, and wherein means is also provided for accurately adjusting the spacing of the latter blades to maintain the desired shearing tension.

Other objects of the invention reside in the details of construction of the various parts; in their relationship and in the mode of operation of the device, as will hereinafter be described.

In accomplishing these and other objects of the invention, I have provided the improved details of construction, the preferred forms of which are illustrated in the accompanying drawing, wherein—

Fig. 1 is a side elevation of a lawn edger mechanism embodied by the present invention.

Fig. 2 is a cross sectional view of the same, taken substantially on the line 2—2 in Fig. 1.

Fig. 3 is a top, or plan view showing attachment of the handle to the ground wheel.

Fig. 4 is a perspective view of the edger.

Referring more in detail to the drawing—

I designates what may be the usual type of traction or ground wheel, as employed for lawn mowers, mounted by a pivot bolt 2 between a pair of straps 3—3' fixed rigidly to and forming an extension part of a handle 4 which, as seen in Fig. 4, is equipped at its upper end with a handle bar 5.

Formed integral with the wheel and concentric thereof, is an internally toothed ring gear 6 and overlying the gear, at the inside of the wheel, is a cover plate 7. This is disposed between the strap 3 and wheel and has a central hole 7a for passage of the bolt 2 therethrough.

Fixed in the lower portion of the cover plate and extending outwardly and perpendicularly therefrom is a tubular bearing 8 in which a cutter disk drive shaft 9 is revolubly contained. At its inner end this shaft has a gear wheel 10 fixed thereon in mesh with the internal ring gear 6 and fixed on the outer end portion of the shaft is a disk or wheel 12 having a plurality of radial cutter blades 13. These blades are equally spaced and of equal length and are so disposed as to pass with shearing action, as the disk revolves, between a pair of shear plates 14—15 fixed respectively to the lower ends of supports 16 and 17 which are securely attached at their upper ends to a post 18 that is fixed in the upper portion of cover plate 7 and extends perpendicularly therefrom above the shaft bearing 8.

The support 16 has a hole 20 which receives the outer end portion of the bearing tube 8. Lock nuts 21—22 are threaded onto the tube and are clamped against opposite sides of the strap, thus to hold the strap and also the shear plate 14 rigidly against lateral play. Likewise, the strap 17 has a hole 25 in which the outer end portion of shaft 9 is revolubly contained. However, there are nuts 26—27 keyed on the shaft 9 at opposite sides of the strap to prevent its swinging inwardly or outwardly relative to the cutter wheel and to maintain the relative spacing of the shear blades 14 and 15.

The shear blade, or plate 14 is riveted or otherwise suitably attached to the lower end of strap 16 and extends downwardly and in a forwardly inclined direction. The shear blade 15 is rigidly mounted by a stud 30 through its upper end which stud in turn is adjustably fixed in the lower end of strap 17 by nuts 31 and 32 threaded thereon against opposite sides of the strap. By adjustment of these nuts, the shear blade 15 may be adjusted toward or from blade 14 thus to provide proper shearing action when the blades 13 pass between them. The angular relationship of the blades 13 with respect to the shear blades 14—15 is such as to cause the shearing action to start at the inner ends of the blades and to progress to their outer ends as the cutter wheel rotates in the direction as indicated by the arrow in Fig. 1.

To prevent rotation of the cover plate on the bolt 2, I have attached a brace bar 40 to the handle and to a lug 41 on the plate adjacent the lower edge.

Assuming the device to be so constructed, in use, it is pushed along the ground like the usual lawn mower. The gear 10 operating in mesh with gear 6 drives the cutter shaft 9 and this in turn rotates the cutter wheel 12 causing the blades 13 to pass with shearing action between shear plates 14 and 15 which extend to some extent below the level of the plane on which the wheel travels.

When wear on the blades or shear plates occurs and the shearing action is impaired, the tension may be taken up by slight inward adjustment of blade 15 by manipulation of nuts 26 and 27 or by an outward adjustment of blade 14 by manipulation of nuts 21 and 22.

This device is especially suited to cutting grass along the edges of sidewalks or along flower beds or close up to walls.

Having thus described my invention, what I claim as new therein and desire to secure by Letters Patent is—

1. In a lawn edger of the character described, a ground wheel, a handle rotatably mounting the ground wheel, a cover plate applied to the ground wheel at one side thereof, a shaft operatively connected for rotation by the ground wheel, mounted on the cover plate and extending laterally therefrom, a post fixed to the cover plate above the shaft, a pair of supports mounted by the post, shear blades adjustably mounted on the supports to extend downwardly and in a forwardly inclined position and in close spaced relation, a cutter wheel fixed on the shaft and blades fixed to the cutter wheel to extend radially therefrom and adapted on rotation of the cutter wheel to pass with shearing action against the shear blades.

2. In a lawn edger of the character described, a ground wheel, a handle rotatably mounting the ground wheel, a cover plate applied to the wheel at one side, a tubular bearing mounted on the cover plate to extend horizontally therefrom at one side of the wheel, a cutter shaft rovolubly contained in the tubular bearing, a gear on the ground wheel and a gear on the cutter shaft meshing therewith, a post fixed to the cover plate and extending horizontally therefrom above the shaft, a pair of supports fixed to the post and extending downwardly therefrom and having openings in their lower portions through which the shaft extends, shear blades fixed in spaced relationship to the lower ends of the supports to extend downwardly and forwardly therefrom, a cutter wheel on the shaft and blades fixed to the cutter wheel and extending radially thereof and adapted on rotation of the cutter wheel to pass between and with shearing action against the shear blades.

JOHN S. CAMPBELL.